United States Patent [19]
Nodelman et al.

[11] Patent Number: 5,973,099
[45] Date of Patent: Oct. 26, 1999

[54] POLYURETHANE RESIN TRANSFER MOLDING SYSTEMS

[75] Inventors: Neil H. Nodelman, Upper St. Clair; David D. Steppan, Gibsonia; Sanjeev Madan, Coraopolis, all of Pa.

[73] Assignee: Bayer Corporation, Pittsburgh, Pa.

[21] Appl. No.: 09/025,621

[22] Filed: Feb. 18, 1998

Related U.S. Application Data

[63] Continuation-in-part of application No. 08/578,000, Dec. 12, 1995, abandoned.

[51] Int. Cl.$^6$ .................................................. C08G 18/16
[52] U.S. Cl. ............................ 528/74.5; 528/81; 528/53; 264/331.19; 264/328.4
[58] Field of Search .............................. 528/74.5, 53, 81; 264/331.19, 328.4

[56] References Cited

U.S. PATENT DOCUMENTS

| | | | |
|---|---|---|---|
| 3,996,172 | 12/1976 | Olstowski et al. | 528/74.5 |
| 4,695,509 | 9/1987 | Cordova et al. | 428/267 |
| 4,757,123 | 7/1988 | Younes | 528/53 |
| 4,800,058 | 1/1989 | Younes | 264/328.4 |
| 4,919,876 | 4/1990 | Savage et al. | 264/258 |
| 5,009,821 | 4/1991 | Weaver | 264/22 |
| 5,302,303 | 4/1994 | Clatty et al. | 252/6.5 |
| 5,306,798 | 4/1994 | Horn et al. | 528/58 |
| 5,401,785 | 3/1995 | Kumagai et al. | 521/112 |
| 5,451,615 | 9/1995 | Birch | 521/132 |

OTHER PUBLICATIONS

E.B. Stark and W.V. Breitigam, "Resin Transfer Molding Materials," and C.F. Johnson, "Resin Transfer Molding," in Engineered Materials Handbook, vol. 1 ("Composites") (Metals Parks, Ohio: ASM International 1987) (month unavailable) pp. 168–171 and 565–568.

G.R. Smoluk, Modern Plastics, 66, 57–65 (Jan., 1989).
J.K. Rogers, Plastics Technology, 35, 50–58 (Mar. 1989).
R.V. Wilder, Modern Plastics, 66, 48–50 (Jul. 1989).

*Primary Examiner*—Rachel Gorr
*Attorney, Agent, or Firm*—Joseph C. Gil; Richard E. L. Henderson

[57] ABSTRACT

This invention relates to a process for preparing optionally reinforced rigid polyurethanes by the reaction, under resin transfer molding conditions at an isocyanate index of 90 to 130, of (a) an organic polyisocyanate, with (b) 15 to 80 percent by weight, based on the total of components (b), (c), and (d), of certain polyester polyols having long-chain fatty acid or fatty alcohol groups, a number average molecular weight of 500 to 3000, and a metal ion content below 100 ppm; and (c) 20 to 85 percent by weight, based on the total of components (b), (c), (d) and (e), of one or more crosslinkers, other than component (b), containing 3 to 8 hydroxyl groups and having a molecular weight of 92 to 1000 and a metal ion content below 100 ppm, (d) 0 to 60 percent by weight, based on the total of components (b), (c), and (d), of an isocyanate-reactive compound, other than a polyester polyol of component (b), having a metal ion content below 100 ppm, selected from (i) an isocyanate-reactive polyol containing 3 to 6 hydroxyl groups and having a number average molecular weight of more than 1000 to 10,000, (ii) an isocyanate-reactive diol having a number average molecular weight of 62 to 10,000, and (iii) mixtures thereof, and (e) 0.05 to 3 parts by weight, based on the total amount of components (b), (c), (d) and (e), of a delayed action catalyst.

13 Claims, No Drawings

POLYURETHANE RESIN TRANSFER MOLDING SYSTEMS

This application is a continuation-in-part of U.S. Ser. No. 08/578,000, filed Dec. 12, 1995, now abandoned.

BACKGROUND OF THE INVENTION

This invention relates to rigid polyurethanes having low water absorption prepared by the resin transfer molding method using polyols based on long-chain fatty acid or fatty alcohol groups.

Resin transfer molding is a form of liquid composite molding in which the reaction conditions typically involve longer reaction times and lower pressures than the commonly used reaction injection molding ("RIM") technique. Consequently, resin transfer molding is particularly suited to the production of fiber-reinforced plastic articles, for which wetting and impregnation of the reinforcement material is often difficult, and the production of very large articles, for which the high pressure molds used in the RIM technique are impractical or unavailable. See, for example, E. B. Stark and W. V. Breitigam, "Resin Transfer Molding Materials," and C. F. Johnson, "Resin Transfer Molding," in *Engineered Materials Handbook*, Vol. 1 ("Composites") (Metals Park, Ohio: ASM International, 1987), pages 168–171 and 565–568, respectively; G. R. Smoluk, *Modern Plastics*, 66, 57–65 (January, 1989); J. K. Rogers, *Plastics Technology*, 35, 50–58 (1989); and R. V. Wilder, *Modern Plastics*, 66, 48–50 (July, 1989). Although the resin transfer molding technique has most commonly been used for polymers other than polyurethanes, the technique can also be used with reactive urethane-based systems. For example, U.S. Pat. Nos. 4,695,509, 4,919,876, and 5,009,821 disclose the preparation of polyurethane composites and U.S. Pat. Nos. 4,757,123 and 4,800,058 disclose the preparation of modified rigid polyisocyanurate polymer compositions by resin transfer molding, and U.S. Pat. No. 5,277,862 discloses the preparation of certain polyurethane elastomers.

Resin transfer molding, however, involves relatively long gel times and is thus often characterized by poor mold release and formation of bubbles. Therefore, an object of the present invention was to find a process for preparing rigid polyurethanes having improved physical properties. It has now been found that the use of certain isocyanate-reactive fatty acid polyester polyols in the resin transfer molding process produces high quality rigid polyurethanes having reduced water absorption.

SUMMARY OF THE INVENTION

This invention relates to a process for preparing an optionally reinforced rigid polyurethane comprising reacting, under resin transfer molding conditions at an isocyanate index of about 90 to about 130, (a) an organic polyisocyanate (preferably an aromatic polyisocyanate or an aromatic polyisocyanate in admixture with 0 to about 40 parts by weight, relative to the aromatic polyisocyanate, of a non-aromatic polyisocyanate), with (b) about 15 to about 80 percent by weight (preferably 20 to 60 percent by weight), based on the total amount of components (b), (c), and (d), of one or more polyester polyols having a number average molecular weight of about 500 to about 3000 (preferably 500 to 2000) and having formula (I)

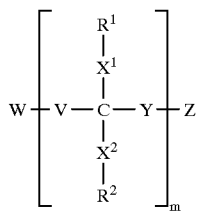

wherein

W is H or HO,

V is a direct bond, —O—, —Alk—, or —(Alk—O)$_n$—,

Y is —O—, —Alk—O—, —Alk—O—(CO)—Alk—(CO)—O—, —Alk—O—(Alk—O)$_p$—, or —A—(CO)—O—,

Z is H, $C_1$–$C_{22}$ alkyl, $C_2$–$C_{30}$ alkanoyl (preferably $C_8$–$C_{30}$ alkanoyl), —Alk—OH, —A—OH, —(CO)—A—OH, —Alk—[—O—(CO)—A—]$_r$—OH, or

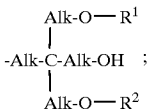

$X^1$ and $X^2$ are independently a direct bond, —O—, or —(Alk—O)$_n$—, $R^1$ and $R^2$ are independently H, $C_1$–$C_{22}$ alkyl, $C_2$–$C_{22}$ alkenyl, $C_8$–$C_{22}$ alkadienyl, $C_8$–$C_{22}$ alkatrienyl, $C_8$–$C_{22}$ alkatetraenyl, $C_2$–$C_{30}$ alkanoyl (preferably $C_8$–$C_{30}$ alkanoyl), —A—OH, or —(CO)—A—OH, Alk is $C_1$–$C_6$ alkylene (wherein each Alk can be the same or different), A is a saturated or unsaturated, branched or unbranched difunctional $C_8$–$C_{30}$ aliphatic group (including $C_8$–$C_{30}$ aliphatic groups attached to oxygen atoms, preferably those of OH groups, at any point along the aliphatic backbone), m is 1 to 20 (preferably 1 to 12), n is 1 to 6, p is 1 to 6, and r is 1 to 20 (preferably 1 to 12), with the provisos that (1) at least two hydroxyl groups must be present, (2) at least one —A— group must be present (that is, in groups Y, Z, $R^1$, and/or $R^2$), (3) when Z is —Alk—O—(CO)—Alk—(CO)—O— or —A—(CO)—O—, then Z must be —Alk—OH, A—OH, —Alk—[—O—(CO)—A—]$_r$—OH, or

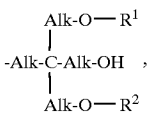

(4) when Z is —Alk—[—O—(CO)—A—]$_r$—OH, then $X^1$ and $X^2$ must be direct bonds, $R^1$ must be $C_1$–$C_{22}$ alkyl, and $R^2$ must be H, and (5) the metal ion content of polyester polyols (b) is less than about 100 ppm (preferably less than 10 ppm); and (c) about 20 to about 85 percent by weight (preferably 40 to 80 percent by weight), based on the total amount of components (b), (c), and (d), of one or more crosslinkers, other than component (b), containing 3 to 8 (preferably 3 to 6) hydroxyl groups and having a number average molecular weight of about 92 to about 1000 (preferably 92 to 750) and a metal ion content of less than about 100 ppm (preferably less than 10 ppm);

(d) 0 to about 60 percent by weight (preferably 0 to 40 percent by weight), based on the total amount of components (b), (c), and (d), of an isocyanate-reactive compound, other than a polyester polyol of component (b), having a metal ion content of less than about 100 ppm (preferably less than 10 ppm) selected from the group consisting of
  (i) one or more isocyanate-reactive polyols containing 3 to 6 (preferably 3) hydroxyl groups and having a number average molecular weight of more than about 1000 to about 10,000 (preferably more than 1000 to 6000),
  (ii) one or more isocyanate-reactive diols having a number average molecular weight of about 62 to about 10,000 (preferably 62 to 6000), and
  (iii) mixtures thereof, (e) about 0.05 to about 3 parts by weight (preferably 0.1 to 2 parts by weight), based on the total amount of components (b), (c), (d) and (e), of a delayed action catalyst, and (f) 0 to about 70% by weight (preferably 0 to 50% by weight), based on the rigid polyurethane, of a reinforcing material (preferably a fibrous mat or a fibrous filler).

DETAILED DESCRIPTION OF THE INVENTION

Suitable organic polyisocyanates for use as component (a) include aliphatic, cycloaliphatic, araliphatic, aromatic, and heterocyclic polyisocyanates of the type described, for example, by W. Siefken in *Justus Liebigs Annalen der Chemie,* 562, pages 75 to 136. Such isocyanates include those having the formula

$$Q(NCO)_n$$

in which n is a number 2 to about 5 (preferably 2 to 3) and Q is an aliphatic hydrocarbon group containing 2 to about 18 (preferably 6 to 10) carbon atoms, a cycloaliphatic hydrocarbon group containing 4 to about 15 (preferably 5 to 10) carbon atoms, an araliphatic hydrocarbon group containing 8 to 15 (preferably 8 to 13) carbon atoms, or an aromatic hydrocarbon group containing 6 to about 15 (preferably 6 to 13) carbon atoms. Examples of suitable isocyanates include ethylene diisocyanate; 1,4-tetramethylene diisocyanate; 1,6-hexamethylene diisocyanate; 1,12-dodecamethylene diisocyanate; cyclobutane-1,3-diisocyanate; cyclohexane-1,3- and -1,4-diisocyanate, and mixtures of these isomers; 1-isocyanato-2-isocyanatomethylcyclopentane; 1-isocyanato-1-methyl-3- and/or 4-isocyanatomethylcyclohexane ("IMCI"); 1,3- and 1,4-bis(isocyanatomethyl)cyclohexane; 1-isocyanato-3,3,5-trimethyl-5-isocyanatomethylcyclohexane ("isophorone diisocyanate" or "IPDI"; see, e.g. German Auslegeschrift 1,202,785 and U.S. Pat. No. 3,401,190); 2,4- and 2,6-hexahydrotoluene diisocyanate and mixtures of these isomers; dicyclohexylmethane-4,4'-diisocyanate ("hydrogenated MDI" or "HMDI"), including the t,t-, c,t-, and c,c-isomers thereof; dicyclohexylmethane-2,4'-diisocyanate; methyl or ethyl (S)-2,6-diisocyanatohexanoate ("lysine diisocyanate"); dimeryl diisocyanate; α,α,α',α'-tetramethyl-1,3- and/or -1,4-xylylene diisocyanate ("TMXDI"); 1,3- and 1,4-phenylene diisocyanate; 2,4- and 2,6-toluene diisocyanate and mixtures of these isomers ("TDI"); diphenylmethane-2,4'- and/or 4,4'-diisocyanate ("MDI"); naphthylene-1,5-diisocyanate; triphenylmethane4, 4',4"-triisocyanate; polyphenyl-polymethylene-polyisocyanates of the type which may be obtained by condensing aniline with formaldehyde, followed by phosgenation ("crude MDI"), which are described, for example, in British Patents 878,430 and 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. Nos. 3,394,164 and 3,644,457; modified polyisocyanates containing allophanate groups of the type described, for example, in British Patent 994,890, Belgian Patent 761,616, and published Dutch Patent Application 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in British Patent 889,050; polyisocyanates obtained by telomerization reactions of the type described, for example, in U.S. Pat. No. 3,654,106; polyisocyanates containing ester groups of the type described, for example, in British Patents 965,474 and 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above.

Polyisocyanates in which at least one of the isocyanate groups is aromatically substituted are preferred. Examples of particularly suitable aromatic polyisocyanates include readily available polyisocyanates such as polyphenyl-polymethylene-polyisocyanates of the type obtained by condensing aniline with formaldehyde, followed by phosgenation; diphenylmethane-2,4'- and/or 4,4'-diisocyanate; 2,4- and 2,6-toluene diisocyanates and mixtures of these isomers; and aromatic polyisocyanates containing carbodiimide groups, urethane groups, allophanate groups, isocyanurate groups, urea groups, or biuret groups ("modified polyisocyanates").

Although it is generally preferable to use only aromatic polyisocyanates, it is often advantageous to use mixtures of such aromatic polyisocyanates with up to 40 percent by weight of non-aromatic polyisocyanates.

Suitable polyisocyanates (a) also include isocyanate-terminated prepolymers prepared by reaction of any of the above polyisocyanates with a substoichiometric amount of an isocyanate-reactive compound (preferably a hydroxyl- or amino-containing compound, and more preferably a hydroxyl-containing compound), such as those disclosed hereinafter for use in accordance with the present invention. See, for example, U.S. Pat. No. 4,374,210. Preferred prepolymers are based on polyether or polyester polyols and, optionally, low molecular weight chain extenders.

Suitable polyester polyols (b) are isocyanate-reactive long-chain fatty esters represented by formula (I) above. As used herein to describe such polyester polyols, the term "$C_1$–$C_{22}$ alkyl" refers to straight or branched chain aliphatic hydrocarbon groups having from 1 to 22 carbon atoms. Examples of $C_1$–$C_{22}$ alkyl are methyl, ethyl, propyl, butyl, pentyl, hexyl, heptyl, octyl, nonyl, decyl, undecyl, lauryl (i.e., dodecyl), myristyl (i.e., tetradecyl), cetyl (i.e., hexadecyl), stearyl (i.e., octadecyl), eicosanyl, and docosanyl, as well as the isomeric forms thereof. The terms "$C_2$–$C_{22}$ alkenyl", "$C_8$–$C_{22}$ alkadienyl", "$C_8$–$C_{22}$ alkatrienyl", and "$C_8$–$C_{22}$ alkatetraenyl" refer to corresponding unsaturated difunctional aliphatic hydrocarbon groups having one to four carbon-carbon double bonds situated along the hydrocarbon chain.

The term "$C_2$–$C_{30}$ alkanoyl" refers to straight or branched chain alkanoyl groups having from 2 to 30 carbon atoms. Examples of $C_2$–$C_6$ alkanoyl are acetyl, propanoyl, butanoyl, pentanoyl, hexanoyl, heptanoyl, octanoyl, lauroyl, myristoyl, palmitoyl, stearoyl, eicosanoyl, and lignoceroyl, as well as the isomeric forms thereof.

The term "$C_1$–$C_6$ alkylene" refers to straight or branched chain difunctional aliphatic hydrocarbon groups having from 1 to 6 carbon atoms. Examples of $C_1$–$C_6$ alkylene are methylene (or methylidene), ethylene, propylene, butylene, pentylene, and hexylene. When present as oxyalkylene groups (i.e., —Alk—O— groups), the resultant polyoxyalkylene groups can be homopolymers (such as polyoxyethylene or polyoxypropylene groups), random copolymers, or block copolymers.

The saturated or unsaturated, branched or unbranched difunctional $C_8$–$C_{30}$ aliphatic groups A include longer chain versions of the $C_1$–$C_6$ alkylene groups mentioned above but also include compounds having one or more carbon-carbon double bonds along the aliphatic chain. For example, unsaturated groups A can include $C_8$–$C_{30}$ alkylene and corresponding multiply unsaturated $C_8$–$C_{30}$ alkadienylene, $C_8$–$C_{30}$ alkatrienylene, and $C_8$–$C_{30}$ alkatetraenylene groups. Because the difunctional $C_8$–$C_{30}$ aliphatic groups can be branched, the points of attachment can located at essentially any point along the aliphatic chain (although one point of attachment is preferably a terminal position of the aliphatic chain). For example, in compounds of the invention based on ricinoleic acid (i.e., d-12-hydroxyoleic acid), group A is characterized by a carbon-carbon double bond and an oxygen atom attached in mid-chain.

Preferred polyester polyols (b) include multifunctional fatty acid esters of formula (I) in which W is H; V is a direct bond; Y is —O—; Z, $R^1$, and $R^2$ are —(CO)—A—OH; $X^1$ and $X^2$ are independently —Alk—O—; Alk is $C_1$–$C_6$ alkylene; A is a difunctional $C_8$–$C_{30}$ aliphatic group as defined above for formula (I); and m is 1. Such compounds can be represented by formula (II)

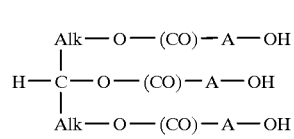

wherein Alk is $C_1$–$C_6$ alkylene and A is a difunctional $C_8$–$C_{30}$ aliphatic group as defined above. A particularly preferred compound of this type is the major constituent of castor oil, a triglyceride having a hydroxyl number of about 158–169 and a fatty acid content of approximately 87% ricinoleic acid (the monohydroxy-substituted fatty acid d-12-hydroxyoleic acid), 7% oleic acid, 3% linoleic acid, 2% palmitic acid, 1% stearic acid, and trace amounts of dihydroxystearic acid, linolenic acid, and eicosanoic acid. The major component of castor oil based on ricinoleic acid is represented by formula (IIa)

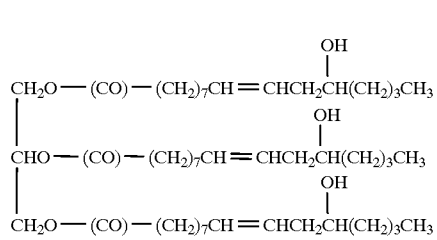

Polyurethanes prepared according to the invention using castor oil are high quality rigid polyurethanes exhibiting reduced water absorption.

The use of castor oil in the preparation of rigid polyurethanes is known. E.g., U.S. Pat. Nos. 5,306,798, 5,401,785, and 5,451,615. For example, U.S. Pat. No. 5,306,798 discloses cast embedding polyurethanes prepared by the reaction of modified diphenylmethane diisocyanates with polyether polyols having an average functionality of at least three and a hydroxyl number of 200 to 1000 (corresponding to equivalent weights of from 56 to about 280) and high alkali metal contents of 150 to 1200 ppm or with mixtures of such polyether polyols with (1) castor oil and/or (2) polyether diols or triols having a hydroxyl number of 90 to 200 (corresponding to equivalent weights of from about 280 to about 620) and low alkali metal contents of less than 10 ppm. However, the use of castor oil in conjunction with polyether polyols containing high levels of alkali metal hydroxides, such as described in U.S. Pat. No. 5,306,798, has been found to provide gel times of less than 60 seconds, which are undesirably short for resin transfer molding, particularly when manufacturing fiber-reinforced articles. Furthermore, potassium carboxylates, alcoholates, and hydroxide are powerful isocyanate trimerization catalysts and would be expected to induce the formation of isocyanurates that give rise to undesirable cross-linking reactions that in turn produce brittle polymer products.

Suitable, but generally less preferred, polyester polyols (b) include multifunctional fatty acid polyesters and polyethers represented by formula (III)

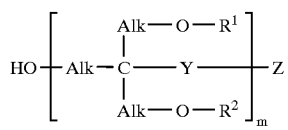
(III)

wherein Y is —Alk—O—(CO)—Alk—(CO)—O— or —Alk—O—(Alk—O)$_p$—; Z is H, $C_1$–$C_{22}$ alkyl, or $C_2$–$C_{30}$ alkanoyl (preferably $C_8$–$C_{30}$ alkanoyl); $X^1$ and $X^2$ are independently —Alk—O—; $R^1$ and $R^2$ are independently $C_2$–$C_{30}$ alkanoyl (preferably $C_8$–$C_{30}$ alkanoyl) or —(CO)—A—OH; Alk is $C_1$–$C_6$ alkylene; A is a difunctional $C_8$–$C_{30}$ aliphatic group as defined above for formula (I); m is 1 to 12; and p is 1 to 6, with the proviso that $R^1$, $R^2$, and Z are selected so that at least two hydroxyl groups are present in each molecule of polyester polyol (b) and with the further proviso that when Y is —Alk—O—(CO)—Alk—(CO)—O—, then Z is

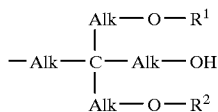

Compounds of formula (III) are based on pentaerythritol are particularly preferred.

Preferred multifunctional fatty acid polyesters (b) are pentaerythritol-based compounds of formula (IIIa)

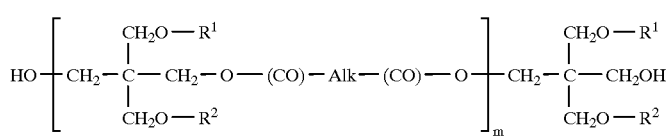
(IIIa)

wherein $R^1$ and $R^2$ are independently $C_2$–$C_{30}$ alkanoyl (preferably $C_8$–$C_{30}$ alkanoyl); Alk is $C_1$–$C_6$ alkylene; and m is 1 to 12.

Preferred multifunctional fatty acid polyethers (b) are pentaerythritol-based compounds of formula (IIIb)

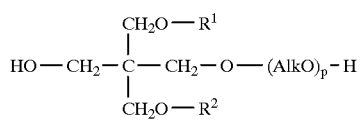
(IIIb)

wherein $R^1$ and $R^2$ are independently $C_2$–$C_{30}$ alkanoyl (preferably at least one of $R^1$ or $R^2$ being $C_8$–$C_{30}$ alkanoyl);

Alk is $C_1$–$C_6$ alkylene (wherein each Alk can be the same or different and are preferably ethylene and/or propylene); and p is 1 to 6.

It is also possible to use pentaerythritol-based compounds similar to compounds of formula (IIIa) and (IIIb) except that Y does not contain a polymeric group. Compounds of this type are represented by formula (IV)

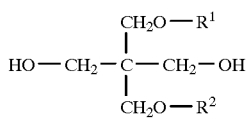
(IV)

wherein $R^1$ and $R^2$ are independently $C_2$–$C_{30}$ alkanoyl (preferably at least one of $R^1$ or $R^2$ being $C_8$–$C_{30}$ alkanoyl).

Suitable, but also generally less preferred, polyester polyols (b) include fatty acid polyesters of formula (I) in which W is HO; V is a direct bond; Y is —A—(CO)—O—; $X^1$ and $X^2$ are direct bonds; $R^1$ is $C_1$–$C_{22}$ alkyl; $R^2$ is H; Z is —Alk—[—O—(CO)—A—]$_r$—OH; Alk is $C_1$–$C_6$ alkylene; A is a difunctional $C_8$–$C_{30}$ aliphatic group as defined above for formula (I); m is 1 to 12; and r is 1 to 12. Such compounds can be represented by formula (V)

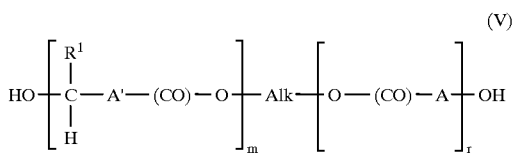
(V)

wherein Alk is $C_1$–$C_6$ alkylene; A is a difunctional $C_{10}$–$C_{30}$ aliphatic group; $R^1$ is $C_1$–$C_{22}$ alkyl and A' is a difunctional $C_8$–$C_{30}$ aliphatic group selected so that the group $R^1$—CH—A'— is a saturated or unsaturated, branched or unbranched difunctional $C_{10}$–$C_{30}$ aliphatic group; m is 1 to 12; and r is 1 to 12. Preferred fatty acid polyesters of formula (V) are diol-initiated polyricinoleic acid polyesters of formula (Va)

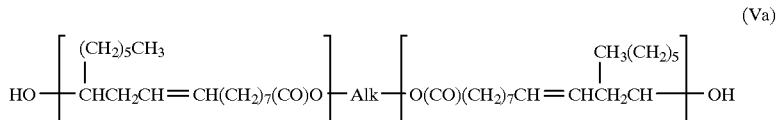
(Va)

wherein Alk is $C_1$–$C_6$ alkylene, m is 1 to 12, and r is 1 to 12.

Suitable hydroxyl-containing crosslinkers (c) include compounds having three or more (most preferably three or four) hydroxyl groups and having a molecular weight of 92 to about 1000 (preferably 92 to 500), as long as such compounds do not fall within the description of component (b). Examples of suitable crosslinkers include known polyols such as glycerol, trimethylolpropane, 1,2,6-hexanetriol, 1,2,4-butanetriol, trimethylolethane, as well as appropriate hydroxyl-containing polyethers, polyesters, polyacetals, polycarbonates, polyesterethers, polythioethers, polyamides, polyesteramides, polysiloxanes, polybutadienes, and polyacetones.

The optional compounds of component (d) include (i) polyols containing three or more (preferably three) isocyanate-reactive hydroxyl groups and having a molecular weight from more than about 1000 to about 10,000 (preferably more than 1000 to 6000) and (ii) isocyanate-reactive diols having a molecular weight of about 62 to about 10,000 (preferably 62 to 6000), as long as such compounds do not fall within the description of component (b). Examples of suitable polyols (d)(i) include polyethers, polyesters, polyacetals, polycarbonates, polyesterethers, polythioethers, polyamides, polyesteramides, polysiloxanes, polybutadienes, and polyacetones having at least three hydroxyl groups. Examples of suitable diols (d)(ii) include glycols, such as 1,2-ethanediol, 1,2- and 1,3-propanediol, 1,4- and 2,3-butanediol, 1,6-hexanediol, 1,8-octanediol, neopentyl glycol, cyclohexanedimethanol, 1-methyl-1,3-propanediol, and 2-methyl-1,3-propanediol, as well as difunctional hydroxyl-containing polyethers, polyesters, polyacetals, polycarbonates, polyesterethers, polythioethers, polyamides, polyesteramides, polysiloxanes, polybutadienes, and polyacetones. Particularly preferred hydroxyl-containing compounds (d) include polyethers or polyesters having 2 or 3 (preferably 2) isocyanate-reactive hydroxyl groups.

Suitable hydroxyl-containing polyethers (d) are known and may be prepared, for example, by the polymerization of epoxides, optionally in the presence of a catalyst such as $BF_3$ or, preferably, potassium hydroxide, or by chemical addition of such epoxides, optionally as mixtures or successively, to starting components containing reactive hydrogen atoms. Suitable epoxides include ethylene oxide, propylene oxide, butylene oxide, tetrahydrofuran, styrene oxide, or epichlorohydrin. Suitable starter components include water, alcohols, or amines, including, for example, ethylene glycol, 1,2- or 1,3-propanediol, 1,2-, 1,3-, or 1,4-butanediol, trimethylolpropane, 4,4'-dihydroxydiphenylpropane, aniline, ammonia, ethanolamine, or ethylene diamine. Sucrose polyethers of the type described, for example, in German Auslegeschriften 1,176,358 and 1,064,938 may also be used according to the invention. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patentschrift 1,152, 536) are also suitable, as are polybutadienes containing hydroxyl groups. Particularly preferred polyethers include polyoxyalkylene polyether polyols, such as polyoxyethylene diol, polyoxypropylene diol, polyoxybutylene diol, and polytetramethylene diol.

Suitable hydroxyl-containing polyesters (d) other than compounds within the definition of component (b) include reaction products of polyhydric alcohols (e.g., diols, triols, tetraols, and mixtures thereof), and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic, or heterocyclic and may be substituted, e.g., by halogen atoms, and/or unsaturated. Suitable polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, dimethyl terephthalic, and terephthalic acid bis-glycol esters. Suitable polyhydric alcohols include ethylene glycol, 1,2- and 1,3-propanediol, 1,4- and 2,3-butanediol, 1,6-hexanediol, 1,8-octanediol, neopentyl glycol, 1,3- and 1,4-bis(hydroxymethyl)cyclohexane, 2-methyl-1,3-propanediol, glycerol, trimethylolpropane, 1,2,6-hexanetriol, 1,2,4-butanetriol, trimethylolethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol, and polybutylene glycols. The polyesters may also contain a proportion of carboxyl end groups. Polyesters of lactones, such as ε-caprolactone, or of hydroxycarboxylic acids, such as ω-hydroxycaproic acid, may also be used. Hydrolytically stable polyesters are preferably used in order to obtain the greatest benefit relative to the hydrolytic stability of the final product. Preferred polyesters include polyesters obtained from adipic acid or isophthalic acid and straight chained or branched diols, as well as lactone polyesters, preferably those based on caprolactone and diols.

Suitable polyacetals include compounds obtained from the condensation of glycols, such as diethylene glycol, triethylene glycol, 4,4'-dihydroxydiphenylmethane, and hexanediol, with formaldehyde or by the polymerization of cyclic acetals, such as trioxane.

Suitable polycarbonates include those prepared by the reaction of diols, such as 1,3-propanediol, 1,4-butanediol, 1,6-hexanediol, diethylene glycol, triethylene glycol, tetraethylene glycol, or thiodiglycol, with phosgene or diaryl carbonates such as diphenyl carbonate (German Auslegeschriften 1,694,080, 1,915,908, and 2,221,751; German Offenlegungsschrift 2,605,024).

Suitable polythioethers include the condensation products obtained by the reaction of thiodiglycol, either alone or with other glycols, dicarboxylic acids, formaldehyde, aminocarboxylic acids, or amino alcohols. The products obtained are polythio mixed ethers, polythioether esters, or polythioether ester amides, depending on the components used.

Suitable polyesteramides and polyamides include, for example, the predominantly linear condensates prepared from polybasic saturated and unsaturated carboxylic acids or the anhydrides thereof and polyvalent saturated or unsaturated amino alcohols, diamines, polyamines, and mixtures thereof.

Other suitable hydroxyl-containing compounds include polyhydroxyl compounds already containing urethane or urea groups and modified or unmodified natural polyols. Products of addition of alkylene oxides to phenol-formaldehyde resins or to urea-formaldehyde resins are also suitable. Furthermore, amide groups may be introduced into the polyhydroxyl compounds as described, for example, in German Offenlegungsschrift 2,559,372.

Polyhydroxyl compounds in which polyadducts or polycondensates or polymers are present in a finely dispersed or dissolved form may also be used according to the invention, provided that the molecular weights fall within the specified ranges. Polyhydroxyl compounds of this type may be obtained, for example, by carrying out polyaddition reactions (e.g., reactions between polyisocyanates and amino functional compounds) or polycondensation reactions (e.g., between formaldehyde and phenols or amines) in situ in the above-mentioned hydroxyl-containing compounds. Processes of this type are described, for example, in German Auslegeschriften 1,168,075 and 1,260,142 and German Offenlegungsschriften 2,324,134, 2,423,984, 2,512,385, 2,513,815, 2,550,796, 2,550,797, 2,550,833, 2,550,862, 2,633,293, and 2,639,254. Suitable compounds may also be obtained according to U.S. Pat. Nos. 3,869,413 or 2,550,860 by mixing a previously prepared aqueous polymer dispersion with a polyhydroxyl compound and then removing water from the mixture.

Polyhydroxyl compounds modified with vinyl polymers, such as those obtained, for example, by the polymerization of styrene and acrylonitrile in the presence of polycarbonate polyols (German Patentschrift 1,769,795 and U.S. Pat. No. 3,637,909) are also suitable for the process of the invention. Synthetic resins with exceptional flame resistance may be obtained by using polyether polyols that have been modified by graft polymerization with vinyl phosphonic acid esters and optionally acrylonitrile, methacrylonitrile, acrylamide, methacrylamide, or hydroxy-functionalized acrylic or methacrylic acid esters according to German Offenlegungsschriften 2,442,101, 2,644,922, and 2,646,141.

Suitable, although less preferred, hydroxyl-containing compounds include organofunctional polysiloxanes containing two terminal isocyanate-reactive groups and structural units of the formula —O—Si(R)$_3$ in which R denotes a C$_1$–C$_4$ alkyl group or a phenyl group, preferably a methyl group. Both the known, pure polysiloxanes containing organofunctional end groups and the known siloxane polyoxyalkylene copolymers containing organofunctional end groups are suitable starting materials according to the invention.

General discussions of representative hydroxyl-containing compounds that may be used according to the present invention can be found, for example, in *Polyurethanes, Chemistry and Technology,* edited by Saunders and Frisch, Interscience Publishers, New York, London, Volume I, 1962, pages 32–42 and pages 44–54, and Volume II, 1964, pages 5–6 and 198–199, and in *Kunststoff-Handbuch,* Volume VII, edited by Vieweg and Hochtlen, Carl-Hanser-Verlag, Munich, 1966, on pages 45–71.

It is also possible, but much less preferred to include up to about 10% by weight, based on the total amount of components (b), (c), and (d), of known isocyanate-reactive compounds containing reactive amino groups or even thiol groups and having a molecular weight of about 60 to about 10,000.

The isocyanate-reactive components used according to the present invention contain only the small amounts of metal ions, including alkali metal ions, that are typically found in commercially available polyols. That is, each of components (b), (c), and (d) has a metal ion content of less than about 100 ppm (preferably less than 10 ppm and more preferably less than 5 ppm). The total metal ion content contained in components (b), (c), and (d) is also preferably less than 100 ppm.

Suitable delayed action catalysts (e) are modified versions of known catalysts, such as modified tin-based catalysts or acid-blocked (i.e., N-protonated) amine catalysts formed from known tertiary amine catalysts and carboxylic or phenolic acids (see U.S. Pat. No. 5,071,613), and can be obtained from a number of commercial sources. Examples of modified tin-based catalysts include TOPCAT 170, TOPCAT 190, and TOPCAT 290 catalysts (available from Tylo Industries, Parsippany, N.J. Examples of acid-blocked amine catalysts include DABCO 8154 catalyst based on 1,4-diazabicyclo[2.2.2]octane and DABCO BL-17 catalyst based on bis(N,N-dimethylaminoethyl) ether (available from Air Products and Chemicals, Inc., Allentown, Pa.) and POLYCAT SA-1, POLYCAT SA-102, and POLYCAT SA-610/50 catalysts based on POLYCAT DBU amine catalyst (available from Air Products and Chemicals, Inc.).

Suitable reinforcing materials (f) include fibrous mats and sheets that are placed in the mold before the reactants are injected into the mold or known fillers and/or reinforcing substances that are introduced in admixture with one of the reactants (generally the isocyanate-reactive component). Examples of suitable materials from which suitable mats or sheets can be made include natural fibers such as burlap, jute, and coconut and synthetic fibers such as glass fibers, nylon fibers, polyester fibers, aramid fibers, liquid crystal fibers, and carbon fibers. Examples of other suitable fillers and/or reinforcing substances include barium sulfate, calcium carbonate, talc, wollastonite, hydrated alumina, clay, kieselguhr, whiting, mica, inorganic or organic microspheres, glass flakes, glass fibers (preferably milled glass fibers), liquid crystal fibers, nylon fibers, aramide fibers, polyester fibers and carbon fibers. In general, the reinforcing materials can be oriented strands, random strands, chipped strands, rovings, or any other suitable form. The reinforcing materials may be used in quantities of up to about 70% by weight (preferably up to 50% by weight) based on the total quantity of the rigid polyurethane (which, in this context, means the amount of the polyurethane/reinforcing material composite).

It is also possible to include various other additives (g) known in the art. Suitable additives may include, for example, internal mold release agents, lubricants, flame retardants, surface-active additives, pigments, dyes, UV stabilizers, plasticizers, and fungistatic or bacteriostatic substances. External release agents, such as silicone oils, can be used instead of or in addition to internal release agents. However, it is generally preferable to use internal release agents, optionally in admixture with external release agents, as described, for example, in German Offenlegungsschriften 2,121,670 and 2,307,589.

Rigid polyurethanes are prepared by process of the present invention by reaction of the components described above under resin transfer molding conditions. The equipment and techniques used for the resin transfer molding differ significantly from those used for structural RIM processing (or for casting into an open mold). In resin transfer molding, for example, reactants are mixed using static or motionless mixers rather than high speed/high impingement mixers. Injection times for resin transfer molding are typically 30 seconds to several minutes, as opposed to about 1 to 5 seconds for the RIM process, and gel times when using resin transfer molding are typically measured in minutes, as opposed to seconds for the RIM process. Injection pressures for resin transfer molding are typically only 10 to 100 psi (about 0.07–0.7 MPa), as opposed to about 1000 to 3000 psi (about 7 to 21 MPa) for structural RIM processes. Consequently, it is possible to use less sophisticated injectors, simpler molds, and smaller mold clamps for resin transfer molding. However, whereas typical structural RIM molds are essentially self-sealing and only passively vented, resin transfer molds typically require a gasketed seal because of the long gel times and are fitted with manually operated vents to permit overfilling to remove air and wet any reinforcing mats.

When carrying out the process of the present invention, the polyurethane-forming reaction components (that is, the polyisocyanate, isocyanate-reactive compounds, catalyst, and any other materials such as blowing agents and other additives and auxiliaries used in the present invention) may be reacted by the known one-stage process, by the prepolymer process, or by the semiprepolymer process using machines such as described above. Polyurethanes produced according to the present invention may be prepared by introducing the reaction mixture into a suitable mold made, for example, from metals (such as aluminum or steel) or plastics (such as unsaturated polyester resin or epoxide resin).

Regardless of the specific method used in carrying out the process of the present invention, the relative quantities of organic polyisocyanate (a) and isocyanate-reactive components (b), (c), and (d) should be selected so that the isocyanate index is from about 90 to about 130, preferably 95 to 120. By "isocyanate index" is meant the quotient of the number of isocyanate groups divided by the number of isocyanate-reactive groups, multiplied by 100. When calculating the isocyanate index, any isocyanate-reactive groups possibly present in the mold release agents (e.g., carboxyl groups) are not taken into account.

The rigid polyurethanes obtainable by the process according to the present invention are particularly suitable for the manufacture of components for automobiles, recreational vehicles, and heavy duty trucks, particularly for the automotive aftermarket, such as simulated convertible frames, seat frames, engine transmission covers, roof panels, spoilers, and tractor fenders.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Polyurethanes were prepared in the following examples using the following polyisocyanates, isocyanate-reactive compounds, and additives:

Polyisocyanates

Isocyanate (a1) Polymeric MDI having an NCO content of 32.9% by weight (available as MONDUR MRS 2 from Bayer Corporation)

Polyester Polyols (b)

Polyol (b1) Castor oil having a hydroxyl number of 164 and an acid number of 2 (available as AA Standard from CasChem)

Comparison Polyols for Component (b)

Polyol (comp1) Propylene-glycol-started polyether diol of propylene oxide having a hydroxyl number of 112

Polyol (comp2) Glycerol-started polyether triol of propylene oxide having a hydroxyl number of 250

Crosslinkers (c)

Triol (c1) Glycerol-started polyether of propylene oxide having a hydroxyl number of 1050 (molecular weight about 160)

Triol (c2) Trimethylolpropane-started polyether of propylene oxide having a hydroxyl number of 550 (molecular weight about 306)

Triol (c3) Ethanolamine-started polyether of propylene oxide having a hydroxyl number of 700 (molecular weight about 240)

Additives

Catalyst (e1) Delayed action amine catalyst available as POLYCAT SA-1 from Air Products and Chemicals, Inc.

Additive (g1) Alkali aluminosilicate (water scavenger available as BAYLITH L from Bayer AG, Germany)

Physical properties of the test polyurethanes were determined using standard laboratory tests.

Examples 1–8

Hand-cast polyurethanes were prepared by mixing the polyisocyanate component with a blend of the isocyanate-reactive compounds, catalyst, and additives. Molds were coated by spraying with a tetrafluoroethylene telomer external mold release agent (available as MS 122/22 from Miller/Stephenson), optionally fitted with fiberglass in the form of mats, and heated at 65° C. The reaction mixtures were introduced into the molds in quantities sufficient to form molded samples having a thickness of 3.2 mm. The samples were removed from the molds after 15 minutes and tested.

Comparison polyurethanes were prepared in the same manner using a blend of comparison polyols (comp1) and (comp2) to simulate the hydroxyl number (and thus equivalent weight) of polyol (b1) (i.e., castor oil).

Quantities of the various components are shown in Table 1 and physical properties of the resultant polyurethanes are shown in Table 2.

Water absorption values for the test samples of Examples 3, 4, 7, and 8 were determined according to ASTM D 570. Samples measuring 7.6 cm×2.5 cm by 3.2 mm cut from the molded samples described above were cleaned by wiping with methylene chloride and conditioned for 24 hours at 22° C. at 50% relative humidity. The bars were then entirely immersed in distilled water, resting on edge, at a temperature of 23° C. At the end of the test periods (i.e., two weeks and four weeks), the specimens were removed and the surface wiped with a dry cloth and immediately weighed. Water absorption values, given as the percent weight gain before and after immersion, are given in Table 2.

In general, tests results show that polyurethanes prepared according to the invention exhibited significantly lower water absorption and greater impact resistance (as determined by the notched Izod method) than corresponding comparison polyurethanes.

TABLE 1

Compositions for Example 1–8

| Components | 1 | 2 (comp) | 3 | 4 (comp) | 5 | 6 (comp) | 7 | 8 (comp) |
|---|---|---|---|---|---|---|---|---|
| Polyol Blend (wt. %) | | | | | | | | |
| Polyol (b1) | 40 | 0 | 40 | 0 | 40 | 0 | 40 | 0 |
| Polyol (comp 1) | 0 | 25 | 0 | 25 | 0 | 25 | 0 | 25 |
| Polyol (comp 2) | 0 | 15 | 0 | 15 | 0 | 15 | 0 | 15 |
| Triol (c1) | 0 | 0 | 0 | 0 | 18 | 18 | 18 | 18 |
| Triol (c2) | 0 | 0 | 0 | 0 | 42 | 42 | 42 | 42 |
| Triol (c3) | 60 | 60 | 60 | 60 | 0 | 0 | 0 | 0 |
| Catalysts (e1) | 0.30 | 0.30 | 0.30 | 0.30 | 0.40 | 0.40 | 0.40 | 0.40 |
| Additive (g1) | 3 | 3 | 3 | 3 | 3 | 3 | 3 | 3 |
| Polyisocyanate (NCO index) | | | | | | | | |
| Isocyanate (a1) | 105 | 105 | 105 | 105 | 105 | 105 | 105 | 105 |
| Fiberglass content (wt. %) | 0 | 0 | 20 | 20 | 0 | 0 | 20 | 20 |

TABLE 2

Properties of reinforced polyurethanes of Example 1–8

| Properties | 1 | 2 (comp) | 3 | 4 (comp) | 5 | 6 (comp) | 7 | 8 (comp) |
|---|---|---|---|---|---|---|---|---|
| Flex modulus (MPa) | 2862 | 3359 | 5490 | 6048 | 2690 | 3166 | 5828 | 5910 |
| Tensile strength (MPa) | 63.1 | 65.6 | 89.6 | 91.5 | 59.5 | 46.9 | 99.4 | 87.3 |
| Elongation (%) | 3.5 | 4.7 | 1.7 | 1.7 | 3.5 | 2.0 | 1.9 | 1.8 |
| Heat deflection temp. (° C.) at 0.46 MPa | 77 | 76 | 183 | 177 | 74 | 73 | 195 | 195 |
| Notched Izod (J/m) | 24 | 27 | 360 | 289 | 28 | 12 | 401 | 315 |
| Water absorption (wt. %) | | | | | | | | |
| at 2 weeks | — | — | 0.60 | 0.87 | — | — | 0.58 | 0.84 |
| at 4 weeks | — | — | 0.71 | 0.99 | — | — | 0.66 | 1.00 |

Example 9

The effect of adding relatively high levels of alkali metal ions to the reactive polyol component (in the manner of U.S. Pat. No. 5,306,798) was determined by measuring gel times for reaction mixtures prepared using the polyol blend of Example 5 according to the invention and using a comparison polyol blend prepared as described for Example 5 but also containing 0.068 g of 85% potassium hydroxide. The quantity of potassium hydroxide was selected to provide a comparison polyol blend having the same potassium ion content as would be obtained using a mixture of polyether triols (c1) and (c2) having a potassium ion content of 671 ppm, which is within the range of 150 to 1200 ppm disclosed for polyether polyols (b1) of U.S. Pat. No. 5,306,798.

The polyisocyanate and polyol components were stirred together for about 30 seconds using an overhead electric stirrer operating at about 400 rpm. Each reaction mixture was then poured into a heated (65° C.) open aluminum mold measuring about 25 cm×25 cm×0.32 cm, at which time a timer was started. The onset of gelation for each mixture was determined by traversing the interior perimeter of the mold with a wood splint until the first solid material was detected, at which time the timer was stopped and the gel time was recorded. Multiple tests were carried out for each reaction mixture to assure reproducibility.

The polyol blend of Example 5 according to the invention produced an acceptable gel time of 69±4 seconds, whereas the comparison polyol blend containing potassium hydroxide produced an unacceptably short gel time of 41±5 seconds. In addition, unacceptable bubble formation was observed in the molded plaque prepared using the comparison polyol blend.

Examples 10–15

Reinforced polyurethanes were prepared using the resin transfer molding technique by mixing the polyisocyanate component with a blend of the isocyanate-reactive compounds, catalyst, and additives. The resin transfer molding machine employed a two-component, high pressure air driven piston-type Graco metering unit having a variable ratio capability for liquid delivery and a static or motionless mixer for mixing. Molds were coated by spraying with a silicone external mold release agent (available as MR 515 from Chemtrend), fitted with varying relative amounts of fiberglass in the form of mats, and heated at 65° C. The reaction mixtures were introduced into the molds in quantities sufficient to form molded samples having a thickness of 3.2 mm. The samples were removed from the molds after 10 minutes and tested.

Quantities of the various components are shown in Table 3 and physical properties of the resultant polyurethanes are shown in Table 4.

Water absorption values for the test panels of Examples 14 and 15 were measured in a manner similar to the method described above for Examples 3, 4, 7, and 8 except that 8 cm×16 cm test panels were suspended in ocean water at Key Largo, Fla. Before the panels were tested as described in ASTM D 570, barnacles, mussels, and marine worms were removed from the panel surfaces. Water absorption values for panels immersed in salt water for six months are given in Table 4.

TABLE 3

Compositions for Examples 10–15

| | Examples | | | | | |
|---|---|---|---|---|---|---|
| Components | 10 | 11 | 12 | 13 | 14 | 15 |
| Polyol Blend (wt. %) | | | | | | |
| Polyol (b1) | 40 | 40 | 40 | 40 | 40 | 40 |
| Triol (c1) | 0 | 18 | 0 | 18 | 0 | 18 |
| Triol (c2) | 0 | 42 | 0 | 42 | 0 | 42 |
| Triol (c3) | 60 | 0 | 60 | 0 | 60 | 0 |
| Catalysts (e1) | 0.30 | 0.40 | 0.30 | 0.40 | 0.30 | 0.40 |
| Additive (g1) | 3 | 3 | 3 | 3 | 3 | 3 |
| Polyisocyanate (NCO index) | | | | | | |
| Isocyanate (a1) | 105 | 105 | 105 | 105 | 105 | 105 |
| Fiberglass content (wt. %) | 0 | 0 | 10 | 10 | 20 | 20 |

TABLE 4

Properties of reinforced polyurethanes of Examples 10–15

| | Examples | | | | | |
|---|---|---|---|---|---|---|
| Properties | 10 | 11 | 12 | 13 | 14 | 15 |
| Flex modulus (MPa) | 2679 | 2663 | 4008 | 4176 | 5429 | 5591 |
| Tensile strength (MPa) | 57.3 | 61.5 | 59.2 | 71.0 | 83.2 | 90.6 |
| Elongation (%) | 5.3 | 5.5 | 2.6 | 3.3 | 3.2 | 3.6 |
| Heat distortion temp. (° C.) | | | | | | |
| 0.46 MPa | 74 | 81.9 | 144 | 200 | 200 | 200 |
| 1.82 MPa | 66.1 | 72.1 | 85.1 | 79.4 | 102.2 | 77.3 |
| Notched Aghast (J/m) | 27 | 32 | 198 | 214 | 347 | 352 |
| Unnotched Aghast (J/m) | 107 | 214 | 294 | 320 | 625 | 545 |
| Water absorption [salt water, 6 mos.] (wt. %) | — | — | — | — | 0.96 | 1.37 |

What is claimed is:

1. A process for preparing a rigid polyurethane comprising reacting, under resin transfer molding conditions at an isocyanate index of 90 to 130, (a) an organic polyisocyanate, with (b) 15 to 80 percent by weight, based on the total amount of components (b), (c), and (d), of one or more polyester polyols having a number average molecular weight of about 500 to about 3000 and having the formula

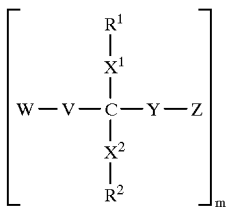

wherein

W is H or HO,

V is a direct bond, —O—, —Alk—, or —(Alk—O)$_n$—,

Y is —O—, —Alk—O—, —Alk—O—(CO)—Alk—(CO)—O—, —Alk—O—(Alk—O)$_p$—, or —A—(CO)—O—,

Z is H, $C_1$–$C_{22}$ alkyl, $C_2$–$C_{30}$ alkanoyl, —Alk—OH, —A—OH, —(CO)—A—OH, —Alk—[—O—(CO)—A—]$_r$—OH, or

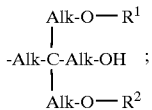

$X^1$ and $X^2$ are independently a direct bond, —O—, or —(Alk—O)$_n$—, $R^1$ and $R^2$ are independently H, $C_1$–$C_{22}$ alkyl, $C_2$–$C_{22}$ alkenyl, $C_8$–$C_{22}$ alkadienyl, $C_8$–$C_{22}$ alkatrienyl, $C_8$–$C_{22}$ alkatetraenyl, $C_2$–$C_{30}$ alkanoyl, —A—OH, or —(CO)—A—OH, Alk is $C_1$–$C_6$ alkylene, wherein each Alk can be the same or different, A is a saturated or unsaturated, branched or unbranched difunctional $C_8$–$C_{30}$ aliphatic group, m is 1 to 20, n is 1 to 6, p is 1 to 6, and r is 1 to 20, with the provisos that (1) at least two hydroxyl groups must be present, (2) at least one —A— group must be present, (3) when Y is —Alk—O—(CO)—Alk—(CO)—O— or —A—(CO)—O—, then Z must be —Alk—OH, —A—OH, —Alk—[—O—(CO)—A—]$_r$—OH, or

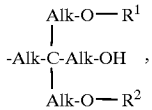

(4) when Z is —Alk—[—O—(CO)—A—]$_r$—OH, then $X^1$ and $X^2$ must be direct bonds, $R^1$ must be $C_1$–$C_{22}$ alkyl, and $R^2$ must be H, and (5) the metal ion content of polyester polyols (b) is less than about 100 ppm; and (c) 20 to 85 percent by weight, based on the total amount of components (b), (c), and (d), of one or more crosslinkers, other than component (b), containing 3 to 8 hydroxyl groups and having a number average molecular weight of about 92 to 1000 and a metal ion content of less than about 100 ppm;

(d) 0 to 60 percent by weight, based on the total amount of components (b), (c), and (d), of an isocyanate-reactive compound, other than a polyester polyol of component (b), having a metal ion content of less than about 100 ppm selected from the group consisting of
(i) one or more isocyanate-reactive polyols containing 3 to 6 hydroxyl groups and having a number average molecular weight of more than 1000 to about 10,000,
(ii) one or more isocyanate-reactive diols having a number average molecular weight of about 62 to about 10,000, and
(iii) mixtures thereof,
(e) 0.05 to 3 parts by weight, based on the total amount of components (b), (c), (d) and (e), of a delayed action acid-blocked amine catalyst, and
(f) 0 to 70% by weight, based on the reinforced rigid polyurethane, of a reinforcing material.

2. A process according to claim 1 wherein polyester polyol (b) is a compound having the formula

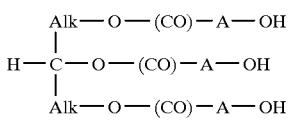

wherein Alk is $C_1$–$C_6$ alkylene and A is a difunctional $C_8$–$C_{30}$ aliphatic group.

3. A process according to claim 1 wherein polyester polyol (b) is a compound having the formula

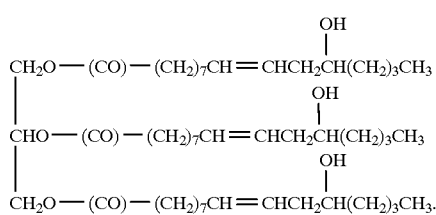

4. A process according to claim 1 wherein polyester polyol (b) is a compound having the formula

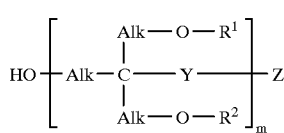

wherein

Y is —Alk—O—(CO)—Alk—(CO)—O— or —Alk—O—(Alk—O)$_p$—;

Z is H, $C_1$–$C_{22}$ alkyl, or $C_2$–$C_{30}$ alkanoyl;

$X^1$ and $X^2$ are independently —Alk—O—;

$R^1$ and $R^2$ are independently $C_2$–$C_{30}$ alkanoyl or —(CO)—A—OH;

Alk is $C_1$–$C_6$ alkylene;

A is a difunctional $C_8$–$C_{30}$ aliphatic group;

m is 1 to 12; and p is 1 to 6, with the proviso that $R^1$, $R^2$, and Z are selected so that at least two hydroxyl groups are present in each molecule of polyester polyol (b) and with the further proviso that when Y is —Alk—O—(CO)—Alk—(CO)—O—, then Z is

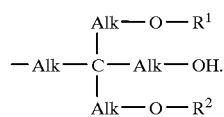

5. A process according to claim 1 wherein polyester polyol (b) is a compound having the formula

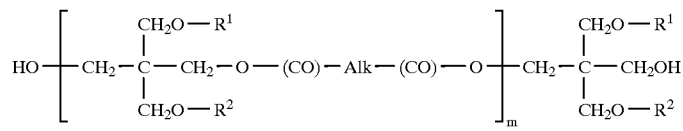

wherein $R^1$ and $R^2$ are independently $C_8$–$C_{30}$ alkanoyl, Alk is $C_1$–$C_6$ alkylene, and m is 1 to 12.

6. A process according to claim 1 wherein polyester polyol (b) is a compound having the formula

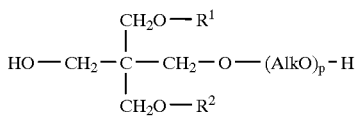

wherein $R^1$ and $R^2$ are independently $C_8$–$C_{30}$ alkanoyl, Alk is $C_1$–$C_6$ alkylene, and p is 1 to 6.

7. A process according to claim 1 wherein polyester polyol (b) is a compound having the formula

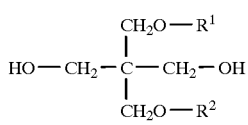

wherein $R^1$ and $R^2$ are independently $C_8$–$C_{30}$ alkanoyl.

8. A process according to claim 1 wherein polyester polyol (b) is a compound having the formula

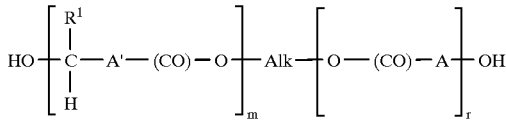

wherein

Alk is $C_1$–$C_6$ alkylene;

A is a difunctional $C_{10}$–$C_{30}$ aliphatic group;

$R^1$ is $C_1$–$C_{22}$ alkyl and A' is a difunctional $C_8$–$C_{30}$ aliphatic group selected so that the group $R^1$—CH—A'— is a saturated or unsaturated, branched or unbranched difunctional $C_{10}$–$C_{30}$ aliphatic group;

m is 1 to 12; and r is 1 to 12.

9. A process according to claim 1 wherein polyester polyol (b) is a compound having the formula

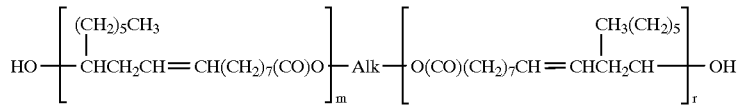

wherein Alk is $C_1$–$C_6$ alkylene, m is 1 to 12, and 1 is to 12.

10. A process according to claim 1 wherein the total metal ion content of polyester polyol (b), crosslinker (c), and isocyanate-reactive compound (d) is less than 100 ppm.

11. A process according to claim 1 wherein polyester polyol (b) has a metal ion content of less than 10 ppm.

12. A process according to claim 1 wherein crosslinker (c) has a metal ion content of less than 10 ppm.

13. A process according to claim 1 wherein isocyanate-reactive compound (d) has a metal ion content of less than 10 ppm.

* * * * *